United States Patent
Nishino

[11] Patent Number: 6,128,566
[45] Date of Patent: Oct. 3, 2000

[54] SHIFT CONTROL FOR AUTOMATIC TRANSMISSION WITH MANUAL SHIFT MODE

[75] Inventor: Kenji Nishino, Kanagawa, Japan

[73] Assignee: Nissan Motor Co., Ltd., Yokohama, Japan

[21] Appl. No.: 09/290,886

[22] Filed: Apr. 14, 1999

[30] Foreign Application Priority Data

Apr. 14, 1998 [JP] Japan .................................. 10-102568
Mar. 26, 1999 [JP] Japan .................................. 11-083232

[51] Int. Cl.[7] .............................. B60K 41/06; G06F 7/00
[52] U.S. Cl. ............................. 701/52; 701/51; 475/254; 475/329; 477/34; 477/107; 477/110; 477/115; 477/125
[58] Field of Search ..................... 701/51, 52; 475/254, 475/329; 477/34, 107, 110, 115, 125

[56] References Cited

U.S. PATENT DOCUMENTS

| | | | |
|---|---|---|---|
| 4,680,992 | 7/1987 | Hayasaki et al. | 74/869 |
| 5,119,696 | 6/1992 | Yamaguchi | 74/866 |
| 5,127,288 | 7/1992 | Hojo et al. | 701/52 |
| 5,577,979 | 11/1996 | Iizuka | 477/109 |
| 5,586,029 | 12/1996 | Schulz et al. | 701/51 |

FOREIGN PATENT DOCUMENTS 62-159839  7/1987  Japan.

OTHER PUBLICATIONS

Nissan Full Range, "Electronically Controlled Automatic Transmission" RE4R01A Type PPI–7, pp. I–25–I–30, 1987 no month.

*Primary Examiner*—William A. Cuchlinski, Jr.
*Assistant Examiner*—Yonel Beaulieu
*Attorney, Agent, or Firm*—Foley & Lardner

[57] ABSTRACT

A vehicle drive train includes an automatic transmission, which has an automatic shift mode and a manual shift mode. The transmission is operable in the automatic shift mode and also operable in the manual shift mode. An input device has a manual select lever. A controller receives an operator mode change demand from the input device and conditions the automatic transmission for operation in one of the automatic and manual shift modes in accordance with the operator mode change demand after a predetermined condition has been met. The predetermined condition is met when the pending shift that is in progress is completed.

3 Claims, 5 Drawing Sheets

FIG.2(a)

|  | A | B |
|---|---|---|
| 1st. RATIO | ON | ON |
| 2nd. RATIO | OFF | ON |
| 3rd. RATIO | OFF | OFF |
| 4th. RATIO | ON | OFF |

FIG.2(b)

| | CLUTCH/BRAKE | | | | | | | |
|---|---|---|---|---|---|---|---|---|
| | F/C | H/C | B/B | LR/B | OR/C | L/OWC | F/OWC | R/C |
| 1st. RATIO | ○ | × | × | (○) | (○) | ○ | ○ | × |
| 2nd. RATIO | ○ | × | ○ | × | (○) | × | ○ | × |
| 3rd. RATIO | ○ | ○ | × | × | (○) | × | ○ | × |
| 4th. RATIO | × | ○ | ○ | × | × | × | × | × |
| REV. | × | × | × | ○ | × | × | × | ○ |

FIG.3

| SW. 19 | SW. 20 | M MODE |
|--------|--------|--------|
| ON     | OFF    | ON     |
| OFF    | ON     | OFF    |

SHIFT CONTROL FOR AUTOMATIC TRANSMISSION WITH MANUAL SHIFT MODE

FIELD OF THE INVENTION

The present invention relates to a vehicle drive train including an engine and a transmission that is operable in a manual shift mode. More particularly, it relates to a shift control for such automatic transmission.

BACKGROUND OF THE INVENTION

In a vehicle drive train, various gear ratios may be established in an automatic transmission. A shift point map stores data that relates the transmission gear ratios to various magnitudes of vehicle speed signal and engine load signal. Ordinarily, an appropriate one of the gear ratios to the current vehicle speed and engine load signals is established in the transmission automatically in accordance with the shift point map. A vehicle operator can hardly recognize what gear ratio is established in the transmission, since shift shocks are reduced to an unnoticeable level. Recently, automatic transmissions have been developed, which are operable in a manual shift mode. In such automatic transmissions, the vehicle operator can manually shift from the current gear ratio up or down to the adjacent next gear ratio.

In such manually ratio controlled automatic transmissions, a manually operable select lever has a manual shift mode in addition to an automatic shift mode. This select lever in its manual shift mode has an upshift position and a downshift position. An operator moves the select lever to the manual shift mode and presses the level to the upshift position to produce an upshift demand or to the downshift position to produce a downshift demand. A transmission controller receives the operator upshift or downshift demand and controls a shift from the current gear ratio to the adjacent next gear ratio.

SUMMARY OF THE INVENTION

In such automatic transmissions, there occur cases where an operator selects a manual shift (M) mode through a select lever while a shift in gear ratio is in progress in an automatic shift (D) mode. In such cases, it is necessary to avoid occurrence of shocks due to an unintentional shift in gear ratio. The operator and/or vehicle passenger may feel uncomfortable upon occurrence of such shocks.

Accordingly, an object of the present invention is to provide a smooth change in shift mode even when a gear ratio shift is in progress in an automatic transmission upon occurrence of an operator mode change demand.

According to the present invention, there is provided a vehicle drive train, comprising:

an automatic transmission having an automatic shift mode and a manual shift mode, said automatic transmission having a plurality of gear ratios and being operable in the automatic shift mode, said automatic transmission being operable in the manual shift mode;

an input device; and a controller receiving an operator mode change demand from said input device and conditioning said automatic transmission for operation in one of the automatic and manual shift modes in accordance with the operator demand after a predetermined condition has been met.

BRIEF DESCRIPTION OF THE DRAWINGS

FIG. 2(a) is a table illustrating the relationship between two shift solenoids and the four forward gear ratios.

FIG. 2(b) is a table illustrating the relationship between torque transmitting units (clutch/brake) and the four forward gear ratios and one reverse ratio.

FIG. 3 illustrates states of M mode select switches.

DESCRIPTION OF THE PREFERRED EMBODIMENT

Figure 1:
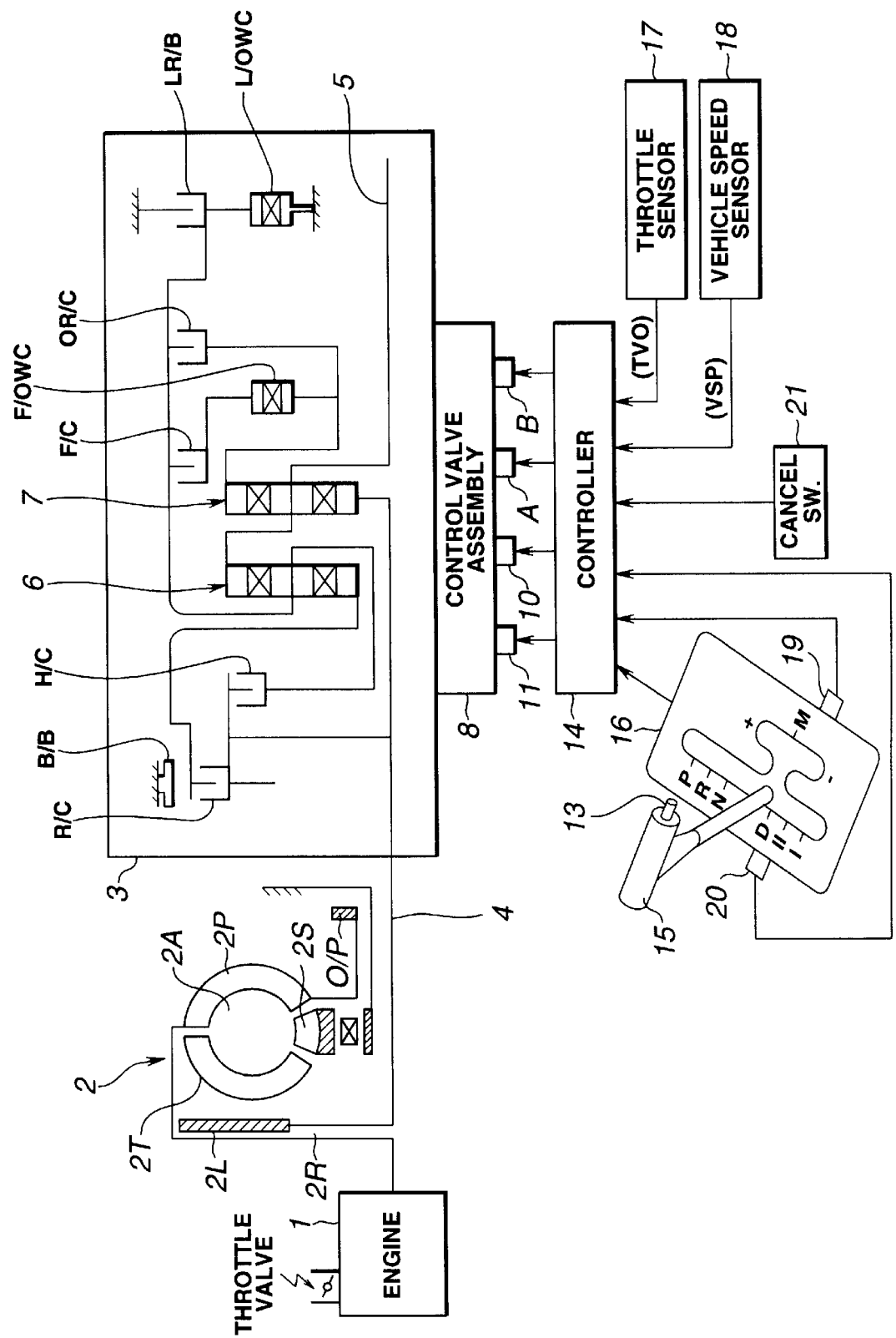
FIG. 1 is a schematic illustration of the preferred implementation of the present invention.

FIG. 1 illustrates an automobile drive train including an engine 1 with a throttle valve which opens in degrees as an operator depress a gas or an accelerator pedal. A torque converter 2 has an input element in the form of a pump impeller 2P, an output element in the form of a turbine runner 2T and a stator 2S. The pump impeller 2P is connected to an output shaft of the engine 1 to be driven thereby. An oil pump O/P is connected to the pump impeller 2P to be driven thereby. The turbine runner 2T is connected to an input shaft 4 of an automatic transmission 3. Oil is disposed between the pump impeller 2P and the turbine runner 2T to provide a hydraulic drive between them. This hydraulic drive provides a slip between the pump impeller 2P and the turbine runner 2T.

A torque converter lock-up clutch 2L is situated between the engine output shaft and the input shaft 4. In this example, the lock-up clutch 2L forms a part of the torque converter 2. When the lock-up clutch 2L is engaged, the torque converter 2 locks up, providing mechanical drive without any slip. The lock-up clutch 2L defines on one side a lock-up release chamber 2R and on the opposite side a lock-up application chamber 2A. When oil is discharged from the lock-up release chamber 2R, the lock-up clutch 2L is engaged. In response to pressure build-up within the lock-up release chamber 2R, the lock-up clutch 2L is disengaged toward its release position.

The automatic transmission 3 provides four forward gear ratios and one reverse gear ratio between the input shaft 4 and an output shaft 5. The drive train including the engine 1, torque converter 2 and the automatic transmission 3 is described in JP-A 62-159839 and U.S. Pat. No. 4,680,992 (issued Jul. 21, 1987 to Hayasaki et al.) that has been incorporated by reference in its entirety.

Briefly explaining, two planetary gear sets, namely a front planetary gear set 6 and a rear planetary gear set 7, are situated between the input and output shafts 4 and 5.

Torque transmitting friction units include a forward clutch F/C, a high clutch H/C, a band brake B/B, a low one-way clutch L/OWC, a forward one-way clutch F/OWC and a reverse clutch R/C. For effective engine braking, a low reverse brake LR/B is arranged in parallel with respect to the low one-way clutch L/OWC and an overrunning clutch OR/C is arranged in parallel with respect to the forward one-way clutch F/OWC.

The table in FIG. 2(b) shows which one or ones of the torque transmitting units should be engaged for each of gear ratios. In this table, the circle ○ indicates engagement and the cross X indicates release. Each of the bracketed circle (○) below the low reverse brake LR/B and the overrunning clutch OR/C indicates engagement required for effective engine braking. Upon demand for engine braking through manipulation of an overdrive (OD) inhibitor switch 13, the overrunning clutch OR/C is engaged for the third gear ratio. Upon demand for engine braking through selection of a II or I range position by a select lever 15, the overrunning clutch OR/C is engaged for the second gear ratio and the low reverse brake LR/B is also engaged for the first gear ratio.

The automatic transmission provides a gear train for the fourth gear ratio. This gear train provides effective engine braking, requiring no additional overrunning clutch for effective engine braking.

For distribution of oil under line pressure, the control valve assembly 8 includes a shift solenoid A, a shift solenoid B and an overrunning clutch solenoid 10. The control valve assembly 8 also includes a lock-up solenoid 11 for controlling the lock-up clutch 2. The detailed description of the control valve assembly 8 with the solenoids A, B, 10 and 11 may be found in description from column 5 line 49 to column 29 line 11 of the incorporated U.S. Pat. No. 4,680,992. In this description, shift solenoids 42 and 44 corresponds to the shift solenoids A and B, a solenoid 34 corresponds to the lock-up solenoid 11, and a solenoid 60 corresponds to the overrunning clutch solenoid 10.

The table in FIG. 2(a) illustrates which one or ones of shift solenoids A and B should be energized for each of the four forward gear ratios. In the table, the symbol "ON" indicates energized state, and the symbol "OFF" indicates de-energized state.

When the lock-up solenoid 11 is in the state of "ON", the lock-up clutch 2L is engaged, causing occurrence of a lock-up application in the torque converter 2. When the lock-up solenoid 11 is in the state of "OFF", the lock-up clutch 2L is released, causing occurrence of a lock-up release in the torque converter 2. The lock-up solenoid 11 is operative to take "ON" in response to the presence of a lock-up signal or "OFF" in response to the absence of the lock-up signal.

The solenoids A, B, 10 and 11 are under the control of a controller 14. The controller 14 includes an input interface, an output interface, a microprocessor unit (MPU), a memory, preferably in the form of a read only memory (ROM) and a random access memory (RAM). The memory includes an ordinary drive shift point map for a drive range in automatic shift mode and a manual drive shift point map for a manual range in manual shift mode. The memory also includes a II range engine braking shift point map for a II range in automatic shift mode and a I range engine braking shift point map for a I range in automatic shift mode. The microprocessor inputs appropriate one of the shift point maps to manipulation of the select lever 15 of an input device. The select lever 15 has an automatic shift (D) mode and a manual shift (M) mode. In the illustrated position in FIG. 1, the select lever 15 is placed at a D (drive) range in the D mode. In the D mode, the select lever 15 has II range and I range, both being selected for effective engine braking. In the D mode, the select lever 15 has a N (neutral) range, a R (reverse) range and a P (park) range. In the M mode, the select lever 15 has an upshift "+" position and a downshift "−" position. The input device is equipped with a selector switch 16. The selector switch 16 produces a selected range signal indicative of a range in the D mode, which the select lever 15 is placed at. It also produces an engine braking demand signal indicative of an operator engine braking demand through the OD inhibitor switch 13. Further, it produces an operator upshift demand signal when, in the M mode, the select lever 15 is pressed to the upshift "+" position or an operator downshift demand signal when, in the M mode, the select lever 15 is pressed to the downshift "−" position.

Figure 3:
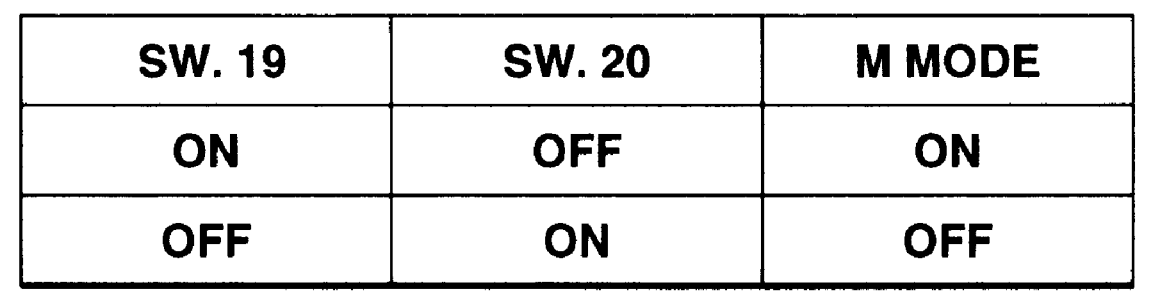

The selector switch 16 includes a set of M mode selecting switches 19 and 20 to sense which one of the D mode and M mode the select lever 15 is placed at. Each of the M mode selecting switches 19 and 20 produces a two-level signal. As shown in FIG. 3, when the select lever 15 is placed at the M mode, the signal of the M mode selecting switch 19 takes an ON level and the signal of the M mode selecting switch 20 takes an OFF level. When the select lever 15 is placed at the D mode and thus not at the M mode, the signals of the M mode selecting switches 19 and 20 takes OFF and ON levels, respectively.

A manually operable cancel switch 21 is provided. Through the cancel switch 21, the operator may cancel the pending shift mode in which the automatic transmission 3 operates. The cancel switch 21 produces a two-level signal.

The controller 14 receives signals from the selector switch 16, the M mode selecting switches 19, 20, and the cancel switch 21.

The controller 14 is connected to an engine load sensor in the form of a throttle sensor 17 and a vehicle speed sensor 18.

The vehicle speed sensor 18 senses, as a first operating parameter indicative of vehicle speed, a speed of the transmission output shaft 5 and produces a vehicle speed signal VSP. The engine load sensor 17 senses, as a second operating parameter indicative of the magnitude of engine load, an opening degree of the throttle valve of the engine 1 and produces an engine load signal TVO. The operator may instruct an engine braking demand in the third gear ratio through the OD inhibitor switch 13.

In the M mode, the select lever 15 is spring biased toward a position away from the upshift "+" position and the downshift "−" position. When the operator wishes an upshift from the current gear ratio to the next adjacent gear ratio, what one has to do is to move the select lever 15 to the upshift "+" position. When the operator wishes a downshift from the current gear ratio to the next adjacent gear ratio, one has to move the select lever 15 to the downshift "−" position.

In response to selection of the M mode, the controller 14 conditions the overrunning clutch solenoid 10 to one of "ON" or "OFF" state to cause engagement of the overrunning clutch OR/C for each of the first to third gear ratios. The engagement of the overrunning clutch OR/C is released for the fourth gear ratio by conditioning the overrunning clutch solenoid 10 to the other state. For the first gear ratio, the manual valve distributes oil under line pressure to the low reverse brake LR/B. Thus, the low reverse brake LR/B is engaged in addition to the overrunning clutch OR/C. During operation in the manual shift mode, the overrunning clutch OR/C is engaged. This provides increased response of the vehicle drive train to manipulation of the accelerator pedal by the operator. In comparison with the automatic shift mode, the lock-up clutch 2L is engaged over increased operating area during operation in the manual shift mode.

Automatic shift in the D range in the automatic shift mode is briefly explained. The controller 14 controls the shift solenoids A and B to accomplish a desired gear ratio that has been given after retrieving data from the shift point map for the D range using the vehicle speed signal VSP and engine load signal TVO. The controller 14 may control the lock-up solenoid 11 such that, during operation with the fourth gear ratio, the lock-up clutch 2L is engaged when the vehicle speed signal VSP is higher than a predetermined vehicle speed and the engine load signal TVO is lower than a predetermined engine load.

In response to the engine braking demand from the OD inhibitor switch 13, the controller 14 prohibits an upshift to the fourth gear ratio and engages the overrunning clutch OR/C through the solenoid 10 to effect engine braking during operation with the third gear ratio.

When the operator selects the II range through the selector lever 15, the controller 14 prohibits an upshift to the third gear ratio and engages the overrunning clutch OR/C through the solenoid 10 to effect engine braking during operation with the second gear ratio.

When the operator selects the I range through the selector lever 15, the controller 14 prohibits upshift to the second gear ratio and engages the overrunning clutch OR/C through the solenoid 10. At the same time, oil under line pressure is supplied to the low reverse brake LR/B from the manual valve that has been set to the "I" range position. Thus, engine braking is effected during operation with the first gear ratio.

Figure 4:
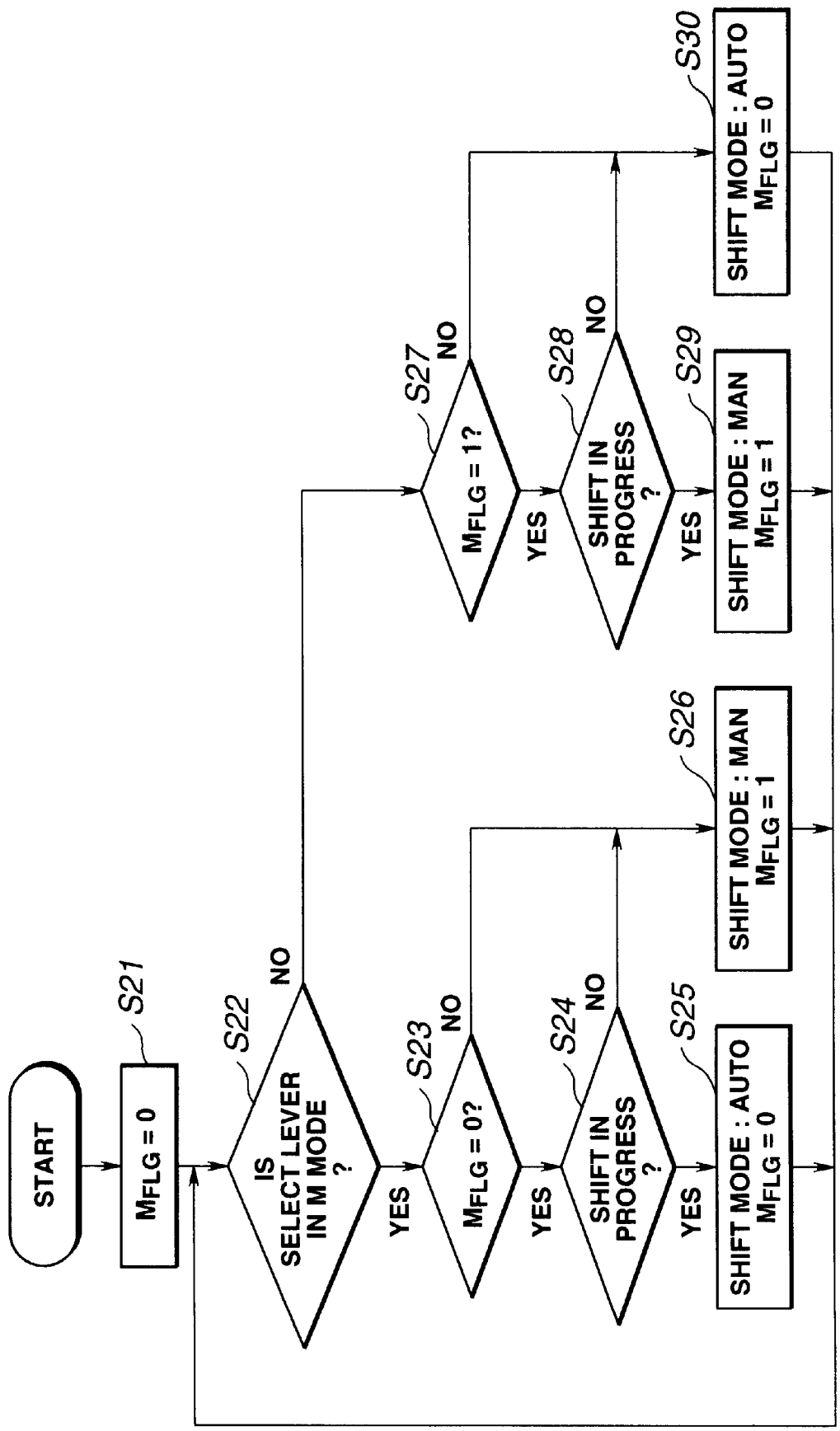
FIG. 4 is a flow chart of a control routine.

The flow chart of FIG. 4 illustrates a control routine of the preferred implementation of the present invention.

In step S21, the MPU initializes a shift mode flag $M_{FLG}$.

In step 522, the MPU determines whether or not the select lever 15 is placed in the M mode. This determination is made based on the levels of the signals from the mode selecting switches 19 and 20. If the M mode is selected, the routine proceeds to step S23. If this is not the case, the routine proceeds to step S27.

In step S23, the MPU determines whether or not the mode flag MFLG in the last cycle was reset to indicate that the automatic shift mode was selected in the last cycle. If this is the case, the routine proceeds to step S24. If this is not the case, the routine proceeds to step 526.

In step S24, the MPU determines whether or not a shift in gear position is in progress. If this is the case, the routine proceeds to step S25. If this is not the case, the routine proceeds to step S26. With regard to the procedure to determine whether or not a shift is in progress, reference should be made to U.S. Pat. No. 5,119,696 (Yamaguchi) or U.S. Pat. No. 5,577,979 (Iizuka).

In step 525, the MPU conditions the automatic transmission for operation in the automatic shift mode and resets the shift mode flag $M_{FLG}$ ($M_{FLG}=0$).

In step 526, the MPU conditions the automatic transmission 3 for operation in the manual shift mode and sets the shift mode flag $M_{FLG}$ ($M_{FLG}=1$).

If, in step 522, the MPU determines that the select lever is not in the M mode and thus in the D mode, the routine proceeds to step S27.

In step 527, the MPU determines whether or not the mode flag MFLG was set in the last cycle to indicate that the manual shift mode was selected in the last cycle. If this is the case, the routine proceeds to step S28. If this is not the case, the routine proceeds to step S30.

In step S28, the MPU determines whether or not a shift in gear position is in progress. If this is the case, the routine proceeds to step S29. If this is not the case, the routine proceeds to step S30.

In step S29, the MPU conditions the automatic transmission for operation in the manual shift mode and sets the shift mode flag $M_{FLG}$ ($M_{FLG}=1$).

In step S30, the MPU conditions the automatic transmission 3 for operation in the automatic shift mode and resets the shift mode flag $M_{FLG}$ ($M_{FLG}=0$).

The automatic transmission 3 operates in the automatic shift mode when the select lever 15 is held in the D mode (steps S22, S27 and S30).

If now the select lever 15 moves from the D mode to the M mode, it is determined whether or not a shift is in progress in the automatic shift mode since the shift mode flag $M_{FLG}$ indicates that the automatic shift mode was selected in the last cycle. While the shift is in progress, the automatic shift mode is maintained. Even if the operator presses the select lever 15 to the upshift "+" or downshift "−" position, the operator upshift or downshift demand is disregarded. Thus, the shift proceeds without any interference. Since the operator upshift or downshift demand is disregarded, the overrunning clutch OR/C or the lock-up clutch 2L will not be engaged.

Upon or immediately after completion of the shift in gear ratio, the automatic transmission 3 is conditioned for operation in the manual shift mode.

If, subsequently, the select lever 15 moves back to the D mode, it is determined whether or not a shift is in progress in the manual shift mode since the shift mode flag $M_{FLG}$ indicates that the manual shift mode was selected in the last cycle. While the shift is in progress, the manual shift mode is maintained. Even if there is a shift demand in the automatic shift mode, this shift demand is disregarded. Thus, the shift proceeds without any interference. Besides, the overrunning clutch OR/C or the lock-up clutch 2L will not be disengaged since this mode change is disregarded.

Upon or immediately after completion of the shift in gear ratio, the automatic transmission 3 is conditioned for operation in the automatic shift mode.

From the preceding description, it will now be appreciated that a shift in progress is completed without any interference even if the select lever 15 moves to initiate a change in mode between the D mode and M mode. Thus, there is no possibility that great shock occur due to establishment of the new shift mode while a shift is in progress in the old shift mode.

Figure 5:
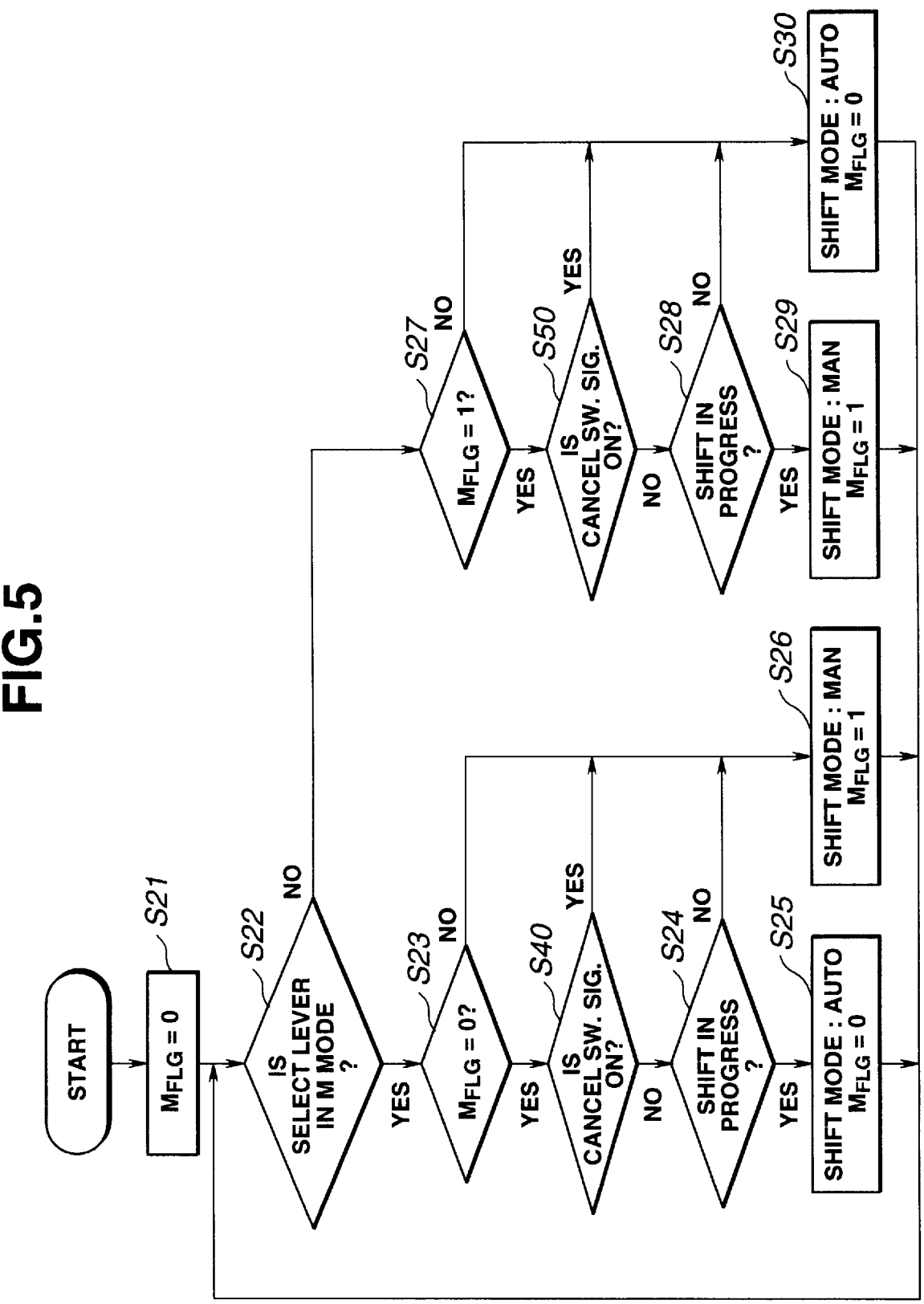
FIG. 5 is a flow chart of a modified control routine.

The flow chart of FIG. 5 illustrates a modification of the control routine shown in FIG. 4.

The modified control routine in FIG. 5 is substantially the same as the control routine illustrated in FIG. 4 except the provision of new steps 540 and S50. Step S40 is disposed between steps S23 and S24, and step S50 is disposed between step S27 and step S28. In step S40, the MPU determines whether or not the signal from the cancel switch 21 is at ON level. If this is the case, the routine proceeds to step S26. If this is not the case, the routine proceeds to step S24. In step S50, the MPU determines whether or not the signal from the cancel switch 21 is at ON level. If this is the case, the routine proceeds to step S30. If this is not the case, the routine proceeds to step S28.

The determination made in steps 540 and 550 may be programmed into main control routine of the controller 14.

From this description, it will be appreciated that the operator can cancel the pending shift mode and initiate the new shift mode even if a shift is in progress.

The content of disclosure of Japanese Patent Application No. 10-102568 (filed Apr. 14, 1998) is hereby incorporated by reference in its entirety.

The above-described implementation of the present invention is an example implementation. Moreover various modifications to the present invention may occur to those skilled in the art and will fall within the scope of the present invention as set forth below.

What is claimed is:

1. In a vehicle drive train,
   an automatic transmission having an automatic shift mode and a manual shift mode, said automatic transmission having a plurality of gear ratios and being operable in the automatic shift mode, said automatic transmission being operable in the manual shift mode;

an input device; and a controller receiving an operator mode change demand from said input device and conditioning said automatic transmission for operation in one of the automatic and manual shift modes in accordance with the operator mode change demand after a predetermined condition has been met, said predetermined condition being met upon either one of completion of a pending shift, which is in progress upon receiving the operator mode change demand and operation of a cancel switch to cancel a pending shift mode.

2. In a vehicle drive train, an automatic transmission having an automatic shift mode and a manual shift mode, said automatic transmission having a plurality of gear ratios and being operable in the automatic shift mode, said automatic transmission being operable in the manual shift mode;

an input device; and a controller receiving an operator mode change demand from said input device and conditioning said automatic transmission for operation in one of the automatic and manual shift modes in accordance with the operator mode change demand after a predetermined condition has been met, said predetermined condition being met upon either one of completion of a pending shift, which is in progress upon receiving the operator mode change demand and operation of a cancel switch to cancel a pending shift mode.

3. In a vehicle drive train, an automatic transmission having an automatic shift mode and a manual shift mode, said automatic transmission having a plurality of gear ratios and being operable in the automatic shift mode, said automatic transmission being operable in the manual shift mode;

an input device; and a controller receiving an operator mode change demand from said input device and conditioning said automatic transmission for operation in one of the automatic and manual shift modes in accordance with the operator mode change demand after a predetermined condition has been met, wherein said input device includes a first switch and a second switch each producing a two-level signal, the two-level signal from the first switch takes one level and the two-level signal from the second switch takes the other level when said input device is operated to indicate the operator mode change demand.

* * * * *